(12) United States Patent
Croak et al.

(10) Patent No.: US 7,532,579 B1
(45) Date of Patent: May 12, 2009

(54) METHOD AND APPARATUS FOR ASSESSING THE INSTALLATION OF A COMPONENT IN A PACKET-SWITCHED NETWORK

(75) Inventors: Marian Croak, Fair Haven, NJ (US); Hossein Eslambolchi, Los Altos Hills, CA (US)

(73) Assignee: AT&T Corp., New York, NY (US)

( * ) Notice: Subject to any disclaimer, the term of this patent is extended or adjusted under 35 U.S.C. 154(b) by 532 days.

(21) Appl. No.: 11/019,710

(22) Filed: Dec. 22, 2004

(51) Int. Cl.
*H04J 1/16* (2006.01)
*G06F 15/173* (2006.01)

(52) U.S. Cl. .................. 370/252; 370/352; 709/224
(58) Field of Classification Search ............. 370/244, 370/242, 243, 229, 340
See application file for complete search history.

(56) References Cited

U.S. PATENT DOCUMENTS

| | | | |
|---|---|---|---|
| 6,026,444 A * | 2/2000 | Quattromani et al. ....... | 709/232 |
| 6,779,034 B1 * | 8/2004 | Mundy et al. ............... | 709/227 |
| 6,910,071 B2 * | 6/2005 | Quintero et al. ............. | 709/224 |
| 7,010,702 B1 * | 3/2006 | Bots et al. ...................... | 726/13 |
| 7,209,473 B1 * | 4/2007 | Mohaban et al. ............ | 370/352 |
| 7,213,065 B2 * | 5/2007 | Watt ........................... | 709/223 |
| 2002/0067714 A1 * | 6/2002 | Crain et al. .................. | 370/352 |
| 2002/0169862 A1 * | 11/2002 | Bialk et al. .................. | 709/223 |
| 2003/0128692 A1 * | 7/2003 | Mitsumori et al. .......... | 370/352 |
| 2005/0125528 A1 * | 6/2005 | Burke et al. ................. | 709/223 |
| 2005/0185607 A1 * | 8/2005 | Svensson et al. ............ | 370/328 |
| 2006/0064473 A1 * | 3/2006 | Borella et al. ............... | 709/220 |

\* cited by examiner

*Primary Examiner*—Andrew Lee

(57) ABSTRACT

A method and system for assessing the installation of a component in a packet-switched network is described. In one example, provisioning scripts for a particular network component are generated. A determination of whether the provisioning scripts match a set of configuration parameters associated with the provisioning scripts is then made. Lastly, an alarm is generated in the event the provisioning scripts do not match the set of configuration parameters.

20 Claims, 3 Drawing Sheets

METHOD AND APPARATUS FOR ASSESSING THE INSTALLATION OF A COMPONENT IN A PACKET-SWITCHED NETWORK

BACKGROUND OF THE INVENTION

1. Field of the Invention

Embodiments of the present invention generally relate to communication networks and, more particularly, to a method and apparatus for assessing the installation of a component in a packet-switched network, e.g., a Voice over Internet Protocol (VoIP) network.

2. Description of the Related Art

Generally, telecommunications systems provide the ability for two or more people or machines (e.g., computerized or other electronic devices) to communicate with each other. A telecommunications system may include various networks for facilitating communication that may be generally organized into packet-switched networks and circuit-switched networks. Exemplary packet-switched networks include internet protocol (IP) networks, asynchronous transfer mode (ATM) networks, frame-relay networks, and the like. An exemplary circuit-switched network includes a plain old telephone system (POTS), such as the publicly switched telephone network (PSTN). Although circuit-switched networks have traditionally been used to provide an effective means for voice communication, packet-switched networks are currently being utilized on a more frequent basis. Another example of packet-switched networks is a Voice over Internet Telephony (VoIP) network.

The engineering and design of VoIP networks involves a series of complex steps intended to produce highly reliable services. These networks are composed of many components that must be interconnected in both a physical and logical manner. Typically, engineers compose specifications to properly instruct the technicians that install this equipment and connect the power supplies to power these components. However, despite the access to the best engineering guidelines and specifications, installation technicians occasionally make mistakes that result in improper connections in these networks. For example, a component that should be connected to a highly resilient DC power supply may mistakenly be plugged into an AC source. Moreover, deploying additional human resources to verify the correct installation of network components can be an expensive process and is subject to human error as well.

SUMMARY OF THE INVENTION

In one embodiment, a method and system for assessing the installation of a component in a packet-switched network is described. More specifically, provisioning scripts for a particular network component are generated. A determination of whether the provisioning scripts match a set of configuration parameters associated with the provisioning scripts is then made. Lastly, an alarm is generated in the event the provisioning scripts do not match the set of configuration parameters.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
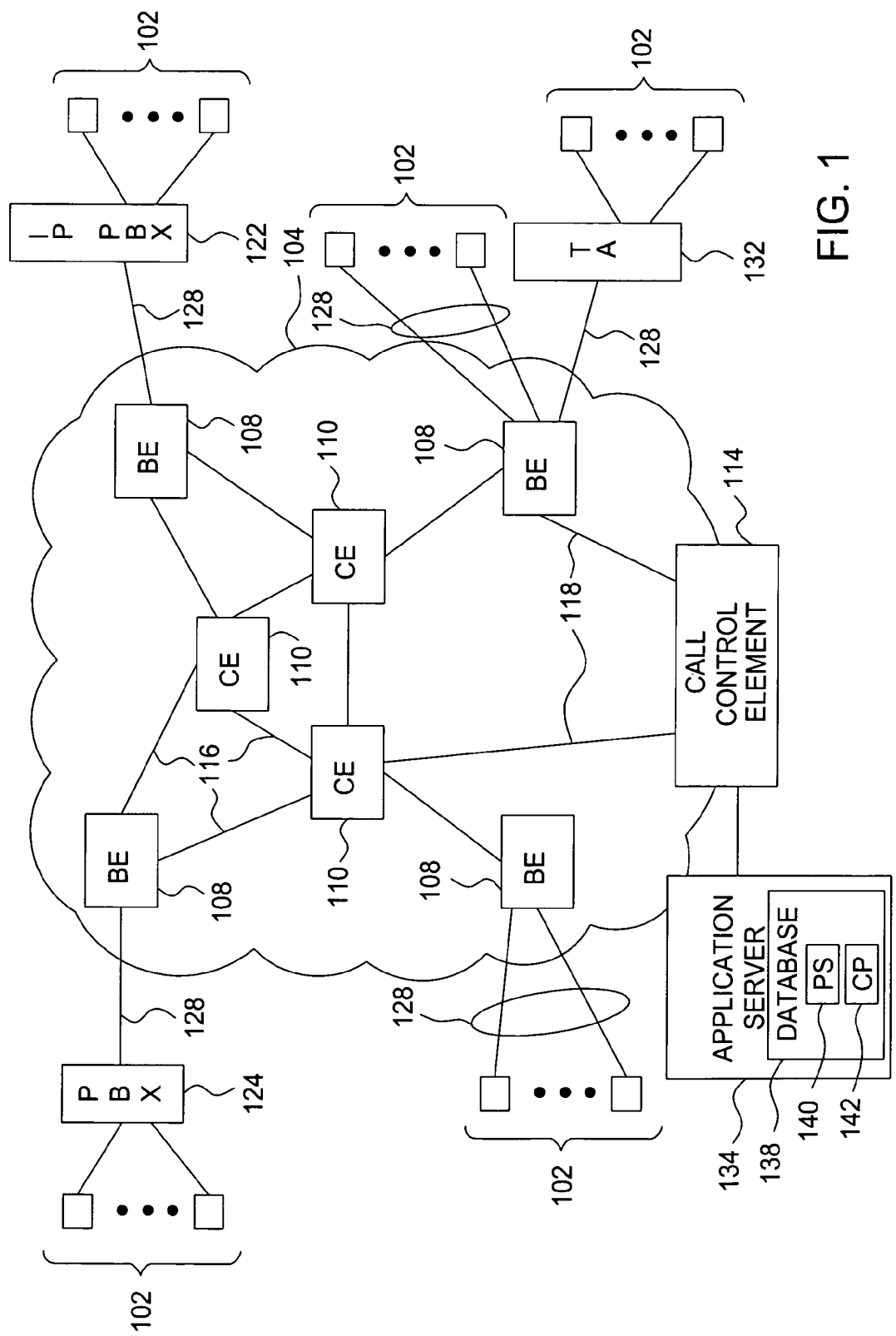
FIG. 1 is a block diagram depicting an exemplary embodiment of a communication system in accordance with the invention.

FIG. 1 depicts an exemplary embodiment of a communication system 100 in accordance with the invention. The communication system 100 comprises a plurality of endpoint devices 102 and a packet-switched network 104. The packet-switched network 104 illustratively comprises a plurality of border elements (BEs) 108, a plurality of core elements (CEs) 110, and a call control element (CCE) 114. The border elements 106 and the core elements 108 communicate via core communication links 116. The call control element 114 may be coupled to one or more of the core elements 110 or border elements 108 through communication link(s) 118. The packet-switched network 104 may comprise one or more of an internet protocol (IP) network, asynchronous transfer mode (ATM) network, frame relay network, and like type packet networks known in the art. For example, the packet-switched network 104 may comprise a voice-over-IP (VOIP) network.

A core element is a network element (such as a router, switch, cross-connect system, server, and the like) that facilitates control and communication between the border elements 106. A border element is a network element (such as a router, switch, cross-connect system, server, and the like) through which the endpoint devices 102 connect to the packet-switched network 104. A border element typically performs functions such as routing, switching, security, admission control, and the like. In one embodiment, a border element translates access protocols into Session Initiation Protocol (SIP), which is then used to facilitate communication within a service provider IP infrastructure.

For purposes of clarity by example, only three core elements 110 are depicted in FIG. 1. It is to be understood that the packet-switched network 104 may include fewer or more core elements 110. Similarly, although four border elements 108 are depicted in FIG. 1 by example, the packet-switched network 104 may include fewer or more border elements. Although the border elements 108 are depicted as being directly connected to the core elements 110, other intervening equipment (not shown) may be deployed.

The call control element (CCE) 114 resides within the VoIP infrastructure and is connected to the BEs using the Session Initiation Protocol (SIP) over the underlying packet-switched network 104. The CCE 114 is typically implemented as a Media Gateway Controller and performs network wide call control related functions as well as interacts with the appropriate VoIP service related servers when necessary. The CCE 114 functions as a SIP back-to-back user agent and is a signaling endpoint for all call legs between all BEs 108 and the CCE 114. The CCE 114 may need to interact with various VoIP related servers in order to complete a call that require certain service specific features, e.g. translation of an E.164 voice network address into an IP address. For purposes of clarity by example, the packet-switched network 104 is shown with one CCE 114. It is to be understood, however, that the packet-switched network 104 may include a plurality of call control elements, each configured to control various border elements, servers, and the like.

The application server 134 is coupled to the packet-switched network 104 via a connection to the call control element 114. The application server 134 may be any type of computer or device that stores data, manages network resources, and performs other conventional computing functions. Depending on the particular embodiment, there may be one or more application servers coupled to one or more call control elements 114. Similarly, although the application server 134 is shown to be coupled to the network 104, the server (or plurality of servers) may only be connected to the network via the call control element (or plurality of CCEs) in another embodiment.

The application server 134 may also contain a database 138. The database 138 may be an electronic filing system or any collection of information organized in such a way that the server 134 can quickly select desired pieces of data. In one embodiment, the database 138 contains provisional scripts 140 and plurality of configuration parameters 142. The provisional scripts 140 are originally generated in various network components (e.g., border elements 108, core elements 110, and the like) upon the particular component's activation (or installation into the network) and are subsequently obtained by the server 134. In one embodiment, the provisional scripts are created by a script generation module that is installed on a particular network component by the server 134. The script generation module then assesses the physical and logical connections existing between the particular network component and all the other network components directly coupled to the network component in question. The types of connections assessed are not limited to communication connections, but rather may also include connections to power supplies and the like. The script generation module also evaluates the internal structure of the component to determine if the proper software processes and application flows have been installed and are executing properly. Similarly, the script generation module determines the requisite trapping and alarming measures are in place. As information on the network component is obtained as described above, the script generation module generates provisioning scripts to record this data.

The configuration parameters 142 stored in the server's database 138 may be comprised of various guidelines. In one embodiment, the configuration parameters are requisite guidelines that pertain to a particular network component (e.g., guidelines for a router will differ from a switch). Specifically, the configuration parameters describe the proper connections (logical and physical) a particular component should have with surrounding components within the network. The parameters may also specify the proper connection to an appropriate power supply. In one embodiment, the parameters detail the requisite software, applications, traps, and alarms that should be installed on a particular network component.

An endpoint device 102 is typically a user terminal (such as a telephone, computer, and the like) by which one or more users communicate with other users in the communication system 100. Some of the endpoint devices 102 communicate with the border elements 108 via edge communication links 128. An endpoint device (such as a time division multiplexing (TDM) phone, an IP phone, an Integrated Services Digital Network (ISDN) phone, a computer, and the like) is able to establish a connection with a border element through the communication links 128. Some of the endpoint devices 102 are capable of being turned off and on or otherwise capable of toggling between an active state in which calls may be received and an inactive state in which calls cannot be received.

In one embodiment, an endpoint device connects to the packet-switched network 104 through a circuit-switched connection with a border element. In another embodiment, an endpoint device connects to the network 104 through an IP connection with a border element. In other embodiments, an endpoint device may connect to a border element via a Signaling System 7 (SS7) connection, a Digital Subscriber Line (DSL) connection, a cable television connection, a customer managed router connection, a customer managed gateway connection, a local area network connection, a frame relay (FR) connection, an asynchronous transfer mode (ATM) connection, and like access technologies as known in the art. Those skilled in the art will appreciate that numerous other techniques for establishing a connection between an endpoint device and a border element exist in the art.

Some of the endpoint devices 102 (e.g., TDM phones) connect to a border element through an edge communication link via a TDM Private Branch Exchange (PBX) 124. Other endpoint devices 102 (e.g., an IP phone) connect to a border element through an edge communication link via an IP Private Branch Exchange (IP-PBX) 122. Still others of the endpoint devices 102 (e.g., computer) connect to a border element through an edge communication link directly. Other endpoint devices 102 (e.g., ISDN phone) connect to a border element through an edge communication link via a terminal adapter (TA) 132.

Figure 2:
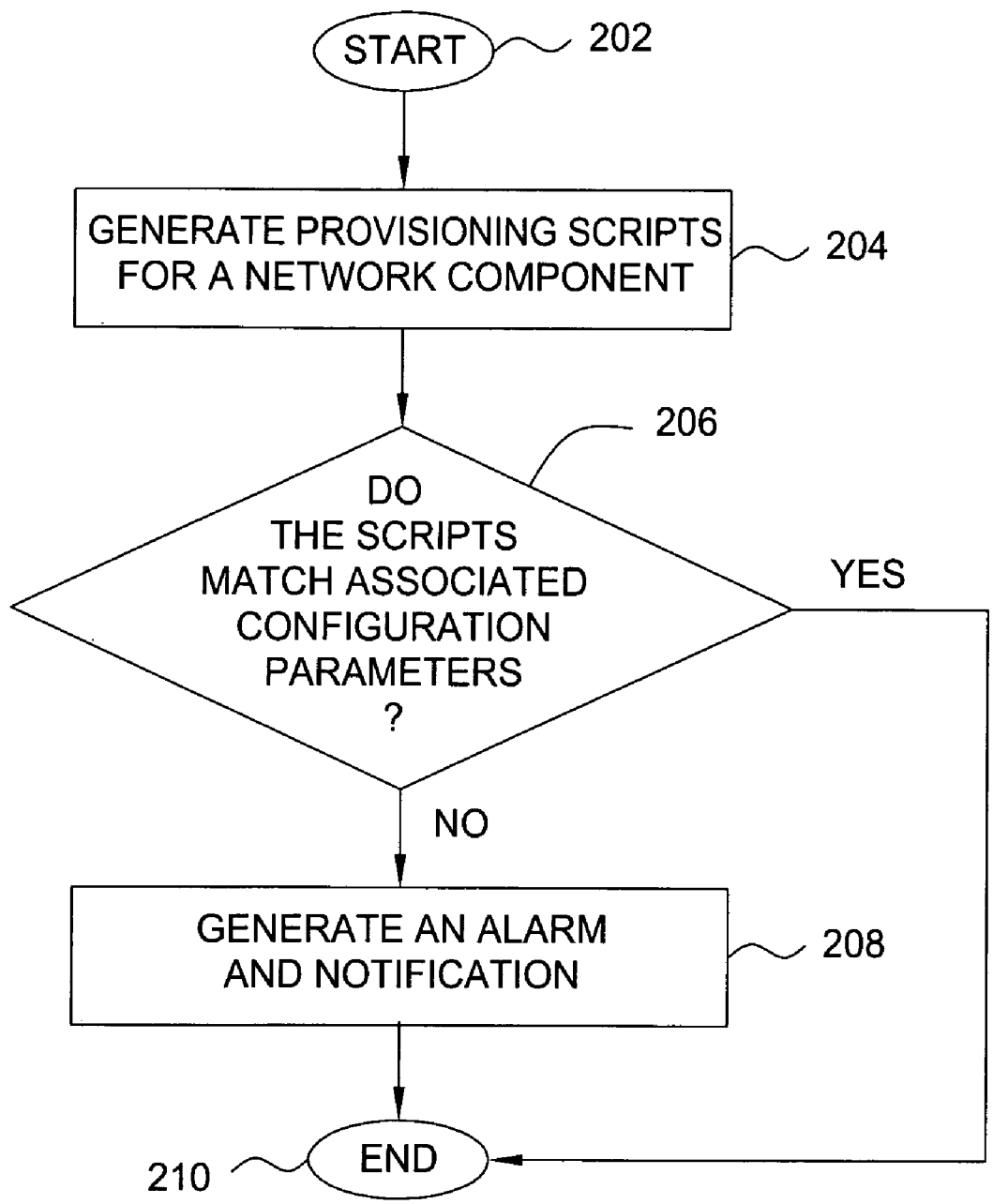
FIG. 2 is a flow diagram depicting an exemplary embodiment of a method for assessing the installation of a component in a packet-switched network in accordance with the invention.

FIG. 2 is a flow diagram depicting an exemplary embodiment of a method 200 for assessing the installation of a component in a packet-switched network in accordance with the invention. Aspects of the method 200 may be understood with reference to the communication system 100 of FIG. 1.

The method 200 begins at step 202. At step 204, provisioning scripts for a network component are generated. In one embodiment, the network component is turned on and connected to the network. In one embodiment, the application server installs a script generation module on the network component. The script generation module then assesses the connections (both physical and logical) of the network component and subsequently generates a plurality of provisioning scripts to record this data. In one embodiment, the script generation module evaluates the network component to determine if the proper software processes are implemented, if the correct application flows are enabled, and if the appropriate traps and alarming mechanisms are correctly installed. Similarly, the module subsequently records this information in provisioning scripts.

At step 206, a determination of whether the provisioning scripts match configuration guidelines associated with the network component. In one embodiment, the provisioning scripts 142 generated in step 204 are obtained by the application server 134 and stored in a database 138. The server 134 then conducts a comparison between the provisioning scripts and a set of configuration parameters 142 that are associated with the network component. If the provisioning scripts match the configuration parameters, the method 200 proceeds to step 210 and ends. If a discrepancy exists between provisioning scripts and the configuration parameters, the method 200 continues to step 208.

At step 208, an alarm is generated in response to the detected difference between the provisioning scripts and the configuration parameters. In one embodiment, the server 134 generates an alarm (i.e., visually, audibly, electronically, etc.) in order to notify operations personnel, or dedicated machine, that a deviation from the configuration parameters has occurred in the particular network component. In one embodiment, the server 134 also generates a notification that specifically details the error that occurred as well as the requisite procedure (e.g., electronic guidelines) to remedy the problem. The notification may comprise an e-mail, text message to a personal digital assistant (PDA) or cellular phone, electronic signal transmitted to a dedicated machine, and the like. The method 200 continues to step 210 and ends.

Figure 3:
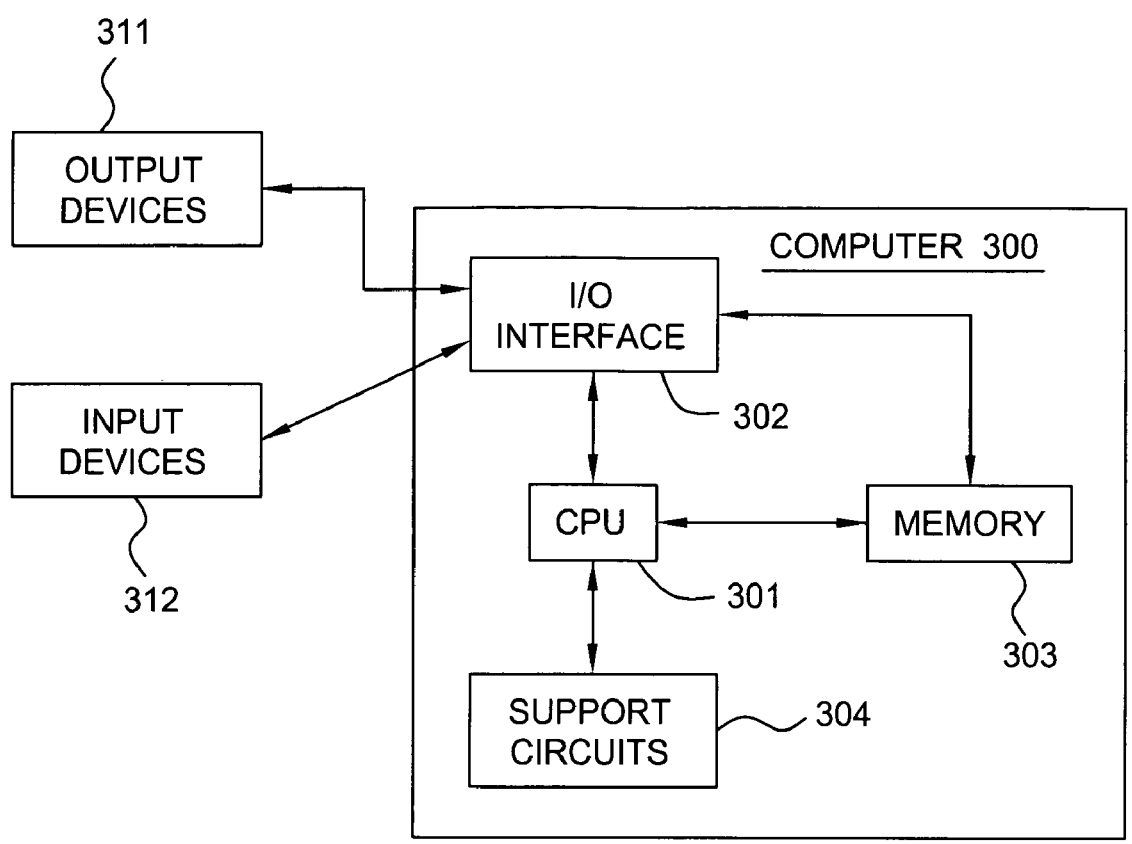
FIG. 3 is a block diagram depicting an exemplary embodiment of a computer suitable for implementing the processes and methods described herein.

FIG. 3 is a block diagram depicting an exemplary embodiment of a computer 300 suitable for implementing the processes and methods described herein. For example, the computer 300 may be used to implement the call control element 112, border elements 108, and core elements 110 of FIG. 1. The computer 300 includes a central processing unit (CPU) 301, a memory 303, various support circuits 304, and an I/O interface 302. The CPU 301 may be any type of microprocessor known in the art. The support circuits 304 for the CPU 301 include conventional cache, power supplies, clock circuits, data registers, I/O interfaces, and the like. The I/O interface 302 may be directly coupled to the memory 303 or coupled through the CPU 301. The I/O interface 302 may be coupled to various input devices 312 and output devices 311, such as a conventional keyboard, mouse, printer, display, and the like.

The memory 303 may store all or portions of one or more programs and/or data to implement the processes and methods described herein. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 300 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 303. The memory 303 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

The invention claimed is:

1. A method for assessing an installation of a component in a packet-switched network, comprising:
    installing said component in said packet-switched network;
    installing a script generation module on said component;
    generating at least one provisioning script for said component;
    determining whether said at least one provisioning script matches a respective at least one configuration parameter; and
    producing an alarm in response to said at least one provisioning script differing from said respective at least one configuration parameter.

2. The method of claim 1, wherein said respective at least one configuration parameter comprises at least one of: requisite connections of said component, requisite installed software of said component, requisite application flows of said component, requisite installed alarm measures of said component, a requisite power source of said component, or requisite installed trapping measures of said component.

3. The method of claim 1, wherein said packet-switched network comprises a voice over internet protocol (VoIP) network.

4. The method of claim 1, wherein said producing comprises:
    generating electronic guidelines identifying discrepancies between said at least one provisioning script and said respective at least one configuration parameter and containing instructions for correcting said discrepancies.

5. The method of claim 4, wherein said guidelines comprise at least one of: at least one electronic message, at least one text message, or at least one electronic signal.

6. The method of claim 1, wherein said generating step commences upon activating said component.

7. The method of claim 1, wherein said alarm is at least one of: a visual alarm, an audible alarm, or an electronic message.

8. A system for assessing an installation of a component in a packet-switched network, comprising:
    means for installing said component in said packet-switched network;
    means for installing a script generation module on said component;
    means for generating at least one provisioning script for said component;
    means for determining whether said at least one provisioning script matches a respective at least one configuration parameter; and
    means for producing an alarm in response to said at least one provisioning script differing from said respective at least one configuration parameter.

9. The system of claim 8, wherein said respective at least one configuration parameter comprises at least one of: requisite connections of said component, requisite installed software of said component, requisite application flows of said component, requisite installed alarm measures of said component, a requisite power source of said component, or requisite installed trapping measures of said component.

10. The system of claim 8, wherein said packet-switched network comprises a voice over internet protocol (VoIP) network.

11. The system of claim 8, wherein said means for producing comprises:

means for generating electronic guidelines identifying discrepancies between said at least one provisioning script and said respective at least one configuration parameter and containing instructions for correcting said discrepancies.

12. The system of claim 11, wherein said guidelines comprise at least one of: at least one electronic message, at least one text message, or at least one electronic signal.

13. The system of claim 8, wherein said means for generating commences upon activating said component.

14. A computer readable medium having stored thereon instruction that, when executed by a processor, causing the processor to perform a method for assessing an installation of a component in a packet-switched network, comprising:
   installing said component in said packet-switched network;
   installing a script generation module on said component;
   generating at least one provisioning script for said component;
   determining whether said at least one provisioning script matches a respective at least one configuration parameter; and
   producing an alarm in response to said at least one provisioning script differing from said respective at least one configuration parameter.

15. The computer readable medium of claim 14, wherein said respective at least one configuration parameter comprises at least one of: requisite connections of said component, requisite installed software of said component, requisite application flows of said component, requisite installed alarm measures of said component, a requisite power source of said component, or requisite installed trapping measures of said component.

16. The computer readable medium of claim 14, wherein said packet-switched network comprises a voice over internet protocol (VoIP) network.

17. The computer readable medium of claim 14, wherein said producing comprises:
   generating electronic guidelines identifying discrepancies between said at least one provisioning script and said respective at least one configuration parameter and containing instructions for correcting said discrepancies.

18. The computer readable medium of claim 17, wherein said guidelines comprise at least one of: at least one electronic message, at least one text message, or at least one electronic signal.

19. The computer readable medium of claim 14, wherein said generating step commences upon activating said component.

20. The computer readable medium of claim 14, wherein said alarm is at least one of: a visual alarm, an audible alarm, or an electronic message.

* * * * *